United States Patent [19]
Kohno et al.

[11] Patent Number: 5,964,398
[45] Date of Patent: Oct. 12, 1999

[54] VANE MEMBER AND METHOD FOR PRODUCING JOINT

[75] Inventors: Akiomi Kohno; Kazuaki Yokoi; Keiji Taguchi, all of Ibaraki-ken; Hiroshi Misumi, Tsuchiura; Yoshiharu Ueyama, Tsukuba; Kazuyuki Koide; Koji Hayashi, both of Ibaraki-ken, all of Japan

[73] Assignee: Hitachi, Ltd., Tokyo, Japan

[21] Appl. No.: 08/929,089

[22] Filed: Sep. 15, 1997

Related U.S. Application Data

[63] Continuation of application No. 08/167,039, Dec. 16, 1993, abandoned.

[30] Foreign Application Priority Data

Mar. 18, 1993 [JP] Japan ..................................... 5-082485

[51] Int. Cl.$^6$ .............................. B23K 31/00; B23P 15/04
[52] U.S. Cl. ................... 228/194; 228/262.42; 228/56.3; 228/231; 29/889.23; 29/889.7; 148/529; 148/530
[58] Field of Search ................................ 29/889.2, 889.7, 29/889.23; 228/194, 195, 231, 193, 208, 250, 262.42, 56.3; 148/529, 530

[56] References Cited

U.S. PATENT DOCUMENTS 3,019,512  2/1962  Stalker .................................. 29/889.2
3,678,570  7/1972  Paulonis et al. .

(List continued on next page.)

FOREIGN PATENT DOCUMENTS

| 0 123 702 | 4/1983 | European Pat. Off. . |
| 1195124 | 4/1958 | France . |
| 28 08 106 | 2/1978 | Germany . |
| 33 39 751 | 11/1983 | Germany . |

OTHER PUBLICATIONS

Metals Handbook Ninth Edition (vol. 6 Welding, Brazing, & Soldering) Ohio: American Society for Metals, 1983, p673.

Some Aspects of Vacuum Brazing As A Production Method for Centrifugal Compressor Imepllers, Nowacki et al, VDI B. Frichte NR. 947 1992.

Database WEPI Week 8328, Derwent Publications, Ltd., London, GB; An 83–708241 & JP–A–58 093 586 (HITA) Hitachi KK) Jun. 3, 1983 *abstract*.

(List continued on next page.)

*Primary Examiner*—S. Thomas Hughes
*Assistant Examiner*—Marc W Butler
*Attorney, Agent, or Firm*—Antonelli, Terry, Stout & Kraus, LLP

[57] ABSTRACT

A vane member comprises a first member and a second member, the first member and the second member are joined by that an insert member whose melting temperature is lower than melting temperatures of the first and second members contacts the first and second members, the insert member is heated to a welding temperature which is lower than the melting temperatures of the first and second members and is higher than the melting temperature of the insert member so that a mutual diffusion between at least an original base component of the insert member and at least an original base component of the first member different from the original base component of the insert member and a mutual diffusion between at least the original base component of the insert member and at least an original base component of the second member different from the original base component of the insert member are caused by the heating, and the mutual diffusions by the heating are continued at least until the original base component of the insert member is replaced by at least one of the original base components of the first member and the second member and the at least one of the original base components of the first member and the second member becomes a substitute base component of the insert member.

21 Claims, 7 Drawing Sheets

U.S. PATENT DOCUMENTS

| | | | |
|---|---|---|---|
| 3,837,931 | 9/1974 | Nemoto et al. | 148/529 |
| 3,904,101 | 9/1975 | Beltran et al. | 29/889.2 |
| 3,905,723 | 9/1975 | Torti, Jr. | 29/889.23 |
| 4,152,816 | 5/1979 | Ewing et al. | 29/889.2 |
| 4,228,944 | 10/1980 | Inamura et al. | 228/198 |
| 4,624,404 | 11/1986 | Ohmae et al. | 228/198 |
| 4,645,720 | 2/1987 | Pircher et al. | 428/683 |
| 4,691,856 | 9/1987 | Haramaki et al. | 228/194 |
| 4,869,421 | 9/1989 | Norris . | |
| 4,973,366 | 11/1990 | Yasuda et al. | 148/11.5 |
| 5,092,942 | 3/1992 | Fraser et al. | 148/529 |
| 5,205,822 | 4/1993 | Mitsunori et al. | 148/111 |
| 5,222,296 | 6/1993 | Doorbar et al. | 29/889.23 |
| 5,251,803 | 10/1993 | Kashiba et al. | 228/194 |
| 5,253,797 | 10/1993 | Ferrando et al. | 228/194 |
| 5,264,011 | 11/1993 | Brown et al. | 29/889.2 |
| 5,305,520 | 4/1994 | Doorbar et al. | 29/889.23 |
| 5,383,985 | 1/1995 | Coulon | 148/530 |
| 5,454,883 | 10/1995 | Yoshie | 148/320 |
| 5,487,794 | 1/1996 | Mitsunori et al. | 148/111 |

OTHER PUBLICATIONS

Welding Journal, vol. 71, No. 10, Oct. 1992, Miami, FL, US pp. 365–S–375–S, XP000310157 J.E. Ramirez Et Al 'Diffusion Brazing in the Nickel–Boron System' *p. 374–S, middle column*.

Patent Abstracts of Japan vol. 004, No. 158 (M039) Nov. 5, 1980 & JP–A–55–107 098 (Hitachi Ltd) Aug. 16, 1980 *abstract*.

Patent Abstracts of Japan vol. 004, No. 176 (M045) Dec. 5, 1980 & JP–A–55 125 394 (Mitsubishi Heavy Ind Ltd) Sep. 27, 1980 *abstract*.

Database WIP Week 8536, Derwent Publications Ltd., London, GB; AN 85–220486 & JP–A–60 141 867 (DASE) Seiko Denshi Kogyo KK) Jul. 26, 1985 *abstract*.

Proceedings of the FIfteenth Turbomachinery Symposium "On The Manufacture of Impellers for Turbocompressors" by Klaus Boddenberg /Germany/Nov. 1986.

"Some Aspects of Vacuum Brazing as a Production Method for Centrifugal Compressor Impellers" Nowacki et al/ 1992.

F I G. 2
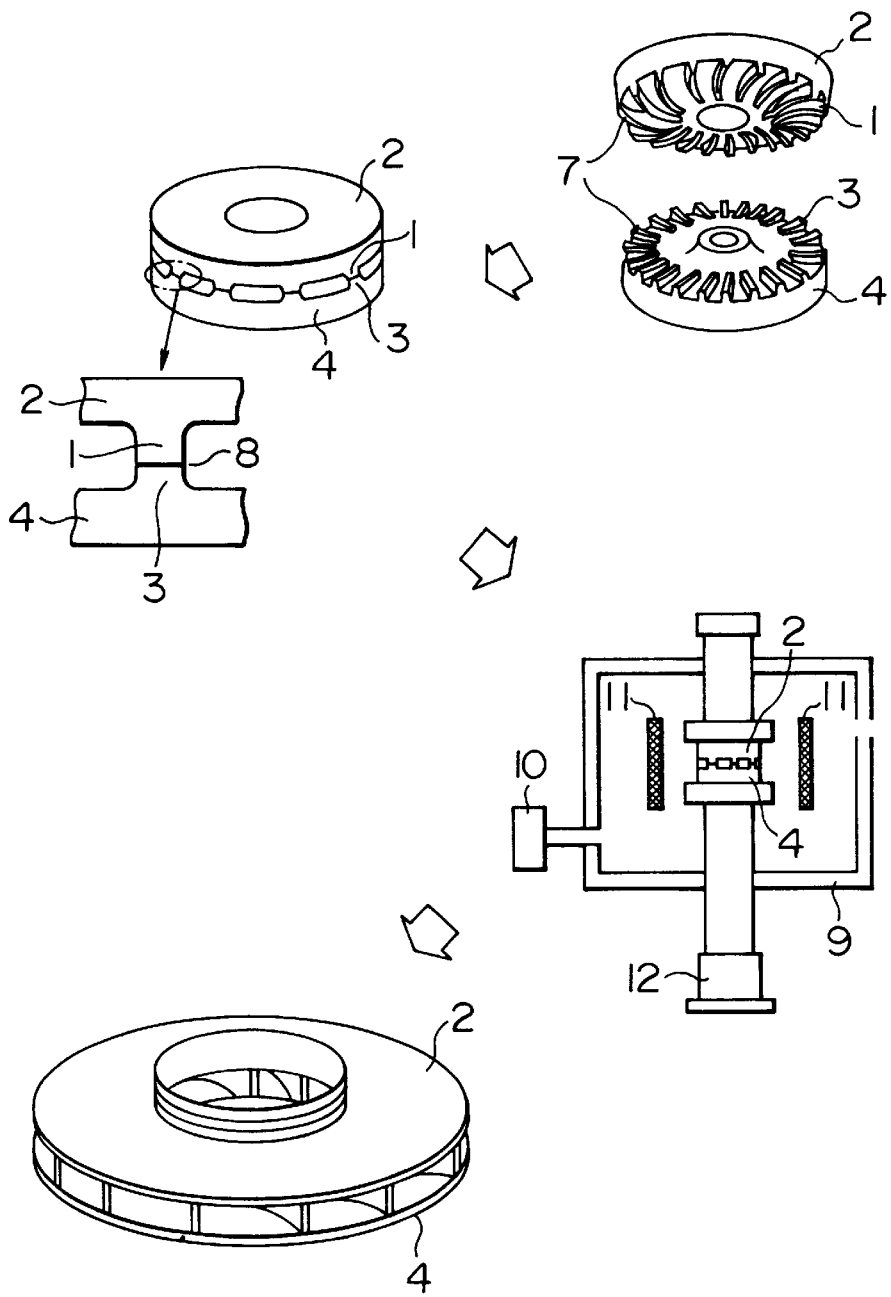

(×400)

(×400)

VANE MEMBER AND METHOD FOR PRODUCING JOINT

This application is a Continuation of application Ser. No. 08/167,039, filed Dec. 16, 1993 abandoned Dec. 5, 1997.

BACKGROUND OF THE INVENTION AND RELATED ART STATEMENT

The present invention relates to a method for forming a vane member or a joint by joining at least two elements through a diffusion bonding process, particularly, the method of the present invention is suitable for producing a member, for example, a vane wheel or a diffuser, of a fluidal machine, for example, a pump, a compressor, a blowing machine or the like.

In a prior-art method for producing a vane member as disclosed by Publication of Japanese Unexamined Patent Application No. Sho-55-107098, two elements each of which has a part of the vane member are made contact each other without an insert member therebetween, and subsequently are joined through the diffusion bonding process to form the vane member. Thereafter, the vane member is quenched and tempered.

In a prior-art method for producing a vane member as disclosed by Publication of Japanese Unexamined Patent Application No. Sho-55-125394, two elements each of which has a part of the vane member are made contact each other without an insert member therebetween, and subsequently are joined through the diffusion bonding process with keeping a minimum distance between the two elements to form the vane member.

OBJECT AND SUMMARY OF THE INVENTION

An object of the present invention is to provide a method for forming a vane member from elements or a joint between the elements by a diffusion bonding without applying an excessive buckling stress to the vane member or joint, without a mechanical strength decrease caused by an insert member between the elements in comparison with a mechanical strength of the elements, and with a characteristic of the joint for a heat treatment substantially similar to a characteristic of the elements for the heat treatment.

According to the present invention, a vane member comprises a first member and a second member, the first member and the second member are joined by that an insert member whose melting temperature is lower than melting temperatures of the first and second members contacts the first and second members, the insert member is heated to a welding temperature which is lower than the melting temperatures of the first and second members and is higher than the melting temperature of the insert member so that a mutual diffusion between at least an original base component of the insert member and at least an original base component of the first member different from the original base component of the insert member and a mutual diffusion between at least the original base component of the insert member and at least an original base component of the second member different from the original base component of the insert member are caused by the heating, and the mutual diffusions by the heating are continued at least until the original base component of the insert member is replaced by at least one of the original base components of the first member and the second member and the at least one of the original base components of the first member and the second member becomes a substitute base component of the insert member substantially in the whole of the insert member.

A method for producing a joint between a first member and a second member, comprises the steps of:

making a first member and a second member contact an insert member whose melting temperature is lower than melting temperatures of the first and second members, heating the insert member to a welding temperature which is lower than the melting temperatures of the first and second members and is higher than the melting temperature of the insert member so that a mutual diffusion between at least an original base component of the insert member and at least an original base component of the first member different from the original base component of the insert member and a mutual diffusion between at least the original base component of the insert member and at least an original base component of the second member different from the original base component of the insert member are caused by the heating, and continuing the mutual diffusions by the heating at least until the original base component of the insert member is replaced by at least one of the original base components of the first member and the second member and the at least one of the original base components of the first member and the second member becomes a substitute base component of the insert member substantially in the whole of the insert member.

In the present invention, since the base component of the insert member is substantially identical to at least one of the base components of the first member and the second member after the diffusion bonding, the mechanical strength and the characteristic for heat treatment (particularly, for quenching) of the joint are substantially equal to those of the first and second members.

The joint may be quenched and tempered after the at least one of the original base components of the first member and the second member becomes the substitute base component of the insert member. Since the characteristic for heat treatment of the joint are substantially equal to those of the first and second members, the mechanical strength of the joint is substantially equal to that of the first and second members after the quenching and tempering. The original base components of the first member and the second member may be iron, and the original base component of the insert member may be nickel. The joint may include a diffusion bonding portion between the first and second members contacting directly each other, a diffusion bonding portion between the first member and the insert member and a diffusion bonding portion between the second member and the insert member.

The mutual diffusions may be performed while the insert member is compressed by the first and second members. The insert member may include at least one of phosphorus, silicon and boron for decreasing the melting temperature of the insert member. A thickness of the insert member may be substantially equal to a roughness of surfaces of the first and second members contacting the insert member. The insert member may include two layers, one of which contacts the first member, and another one of which contacts the second member, an original base component of the one of the two layers may be nickel, and an original base component of the another one of the two layers may be phosphorus, silicon or boron.

The insert member may be arranged on at least one of the first and second members through a plating process. The insert member may have an ultra fine grain shape, or an amorphous leaf shape.

The welding temperature may be not higher than a maximum temperature for preventing an excessive crystal growth of at least one of the first and second members. The joint may be annealed to more advance the mutual diffusion after the at least one of the original base components of the first member and the second member becomes the substitute base component of the insert member at least partially in the insert member. The joint may be annealed and subsequently quenched and tempered, after the at least one of the original base components of the first member and the second member becomes the substitute base component of the insert member at least partially in the insert member. If the insert member is fixed onto a surface of the vane member on which a fluid passes, the insert member prevents a corrosion of the surface.

BRIEF DESCRIPTION OF THE DRAWINGS

FIG. 2 includes schematic views showing a proceeding in a diffusion bonding method according to the present invention.

DETAILED DESCRIPTION OF PREFERRED EMBODIMENTS

Figure 1A:
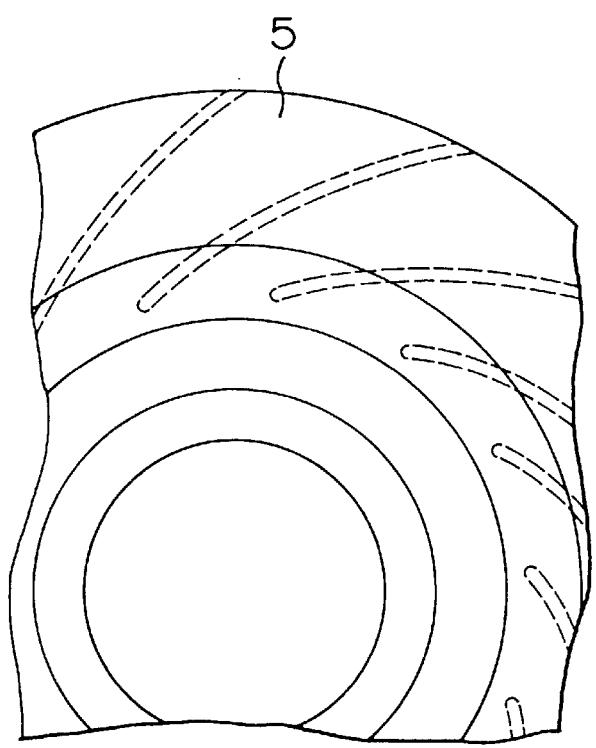
FIG. 1 includes a front view and a side cross-sectional view showing a full-shroud vane wheel formed by the diffusion bonding according to the present invention.
Figure 1B:
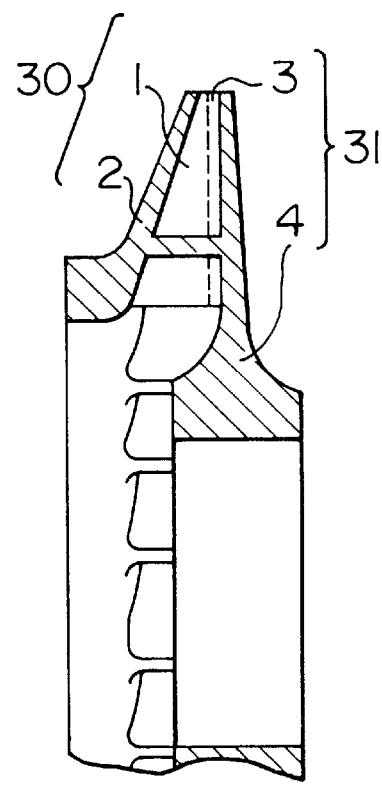

FIGS. 1–5 show a first embodiment of a full-shroud vane wheel and a method for producing it, according to the present invention. The full-shroud vane wheel is made of 13 weight percent Cr steel. A first member 30 having a part 1 of each vane and a side plate 2 and a second member 31 having a part 3 of each vane and a core plate 4 are joined at front end surfaces 7 of the parts 1 and 2 by a diffusion bonding. The front end surfaces 7 of the parts 1 and 2 extend substantially perpendicularly to a rotational axis of the vane wheel. The vanes formed by combinations of the parts 1 and 2 extend substantially parallel to the rotational axis of the vane wheel.

As shown in FIG. 2, the first member 30 with the part 1 of each vane extending integrally from the side plate 2 and the second member 31 with the part 3 of each vane extending integrally from the core plate 4 are formed firstly. A roughness of the front end surfaces 7 is limited from 3 $\mu$m to 5 $\mu$m.

A Ni—P (phosphorus content: 9–10 weight percent) layer 8 with a thickness of about 3 $\mu$m (actual thickness 2–5 $\mu$m) is formed on the front end surfaces 7 and surfaces of vanes extending continuously from the front end surfaces 7 by an electroless plating. Each of the front end surfaces 7 of the part 1 and each of the front end surfaces 7 of the part 3 are made contact each other to form the vane, and the combination of the first and second members 30 and 31 is received by an inside of a vacuum hot-press furnace 9. After the inside of the vacuum hot-press furnace 9 is vacuumed to $10^4$ torr by a vacuum device 10, the combination of the first and second members 30 and 31 is heated to 1050° C. by a heater 11. Subsequently, the combination of the first and second members 30 and 31 is compressed by a pressing device 12 to generate a compression surface stress of about 0.1 kg/mm$^2$ on the front end surfaces 7, and these heating and compressing conditions are kept for 8 hours. Incidentally, the vacuum condition may be released after the diffusion bonding proceeds to such a degree that oxide is prevented from being generated on the front end surfaces 7.

Since a melting temperature of the Ni—P layer 8 is 880° C., the Ni—P layer 8 is melted on the front end surfaces 7 by the heating so that a mutual diffusion between (Ni and P) of the Ni—P layer 8 and (Fe and Cr) of the parts 1 and 2 occurs. A part of the Ni—P layer 8 may flow out from the front end surfaces 7.

By the heating and compressing conditions (1050° C., 0.1 kg/mm$^2$ compression surface stress), micro-convex surfaces in the front end surfaces 7 are deformed or squashed plastically with discharging the Ni—P layer 8 from contact areas between the micro-convex surfaces so that a direct contact area between the parts 1 and 2 is increased. And, spaces formed by micro-concave surfaces in the front end surfaces 7 are filled by the Ni—P layer 8.

Figure 3:
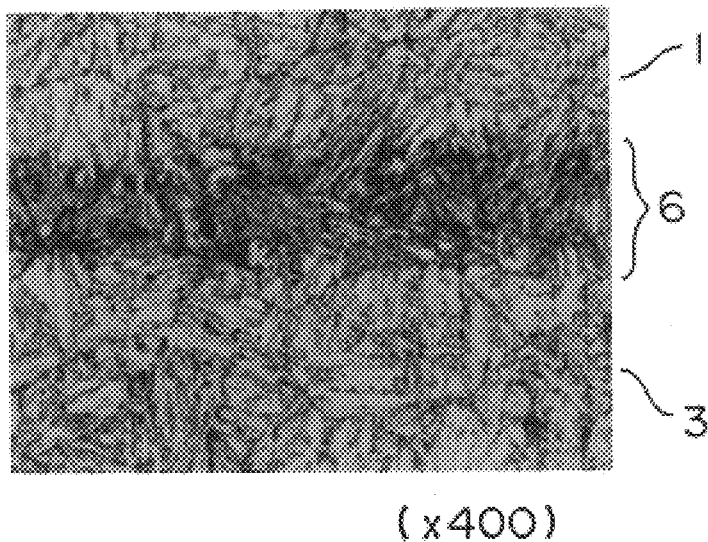
FIG. 3 is a photograph showing a tempered martensite of a joint formed by the diffusion bonding according to the present invention.

The mutual diffusion between (Ni and P) of the Ni—P layer 8 and (Fe, C and Cr) of the parts 1 and 2 proceeds significantly in the 8 hours, so that (Ni and P) of the Ni—P layer 8 are substantially completely replaced by (Fe, C and Cr), as proved by X-ray micro-analyzer. After the diffusion bonding described above, the full-shroud vane wheel is quenched from 980° C. and tempered by 680° C. As shown in FIG. 3, the Ni—P layer 8 is substantially completely replaced by a joint layer 6 whose components and content ratios thereof are substantially equal to the components and content ratios of the parts 1 and 2, so that a martensite crystal structure of the joint layer 6 is substantially equal to that of the parts 1 and 2 after quenching and tempering the full-shroud vane wheel and a tensile strength (80 kg/mm$^2$) and charpy impact value (10 kg·m/cm$^2$) of the joint layer 6 are substantially equal to those of the parts 1 and 2. An axial length of the full-shroud vane wheel after the diffusion bonding is small by 2% in comparison with an axial length thereof before the diffusion bonding.

Figure 5:
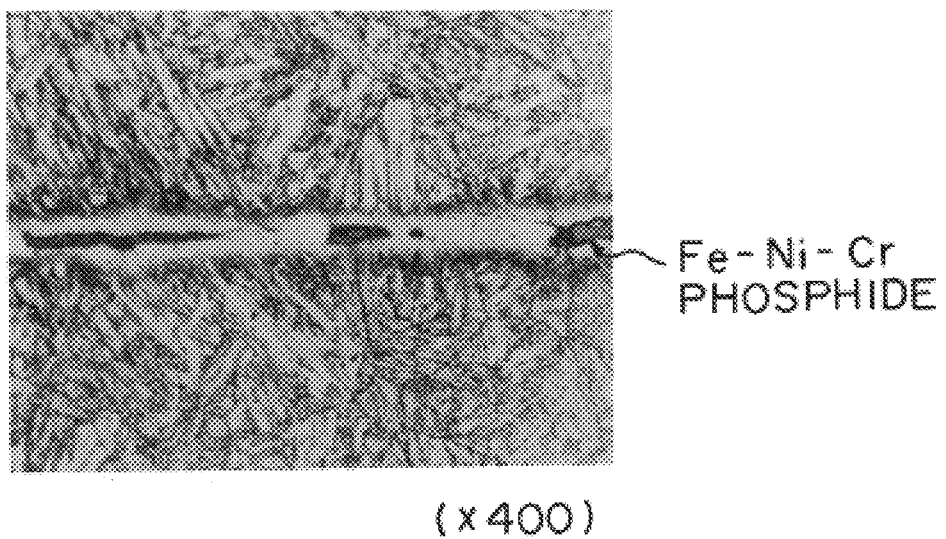
FIG. 5 is a photograph showing an undesirable phosphide formed by an insufficient mutual diffusion in the joint.

If the mutual diffusion is not sufficient and a content of either Ni or P is high in the joint layer 6 after the diffusion bonding, a crystal structure of the joint layer 6 does not change to the martensite crystal structure by the quenching and tempering and a high charpy impact value of the joint layer 6 is not obtained, as shown in FIG. 5. When the joint layer 6 includes a high-Ni-content layer after the diffusion bonding, the tensile strength of the joint layer 6 is substantially equal to that of the parts 1 and 2, but, the high charpy impact value of the joint layer 6 is not obtained. Therefore, it is important for obtaining the high charpy impact value of the joint layer 6 that the mutual diffusion is performed sufficiently.

Figure 4:
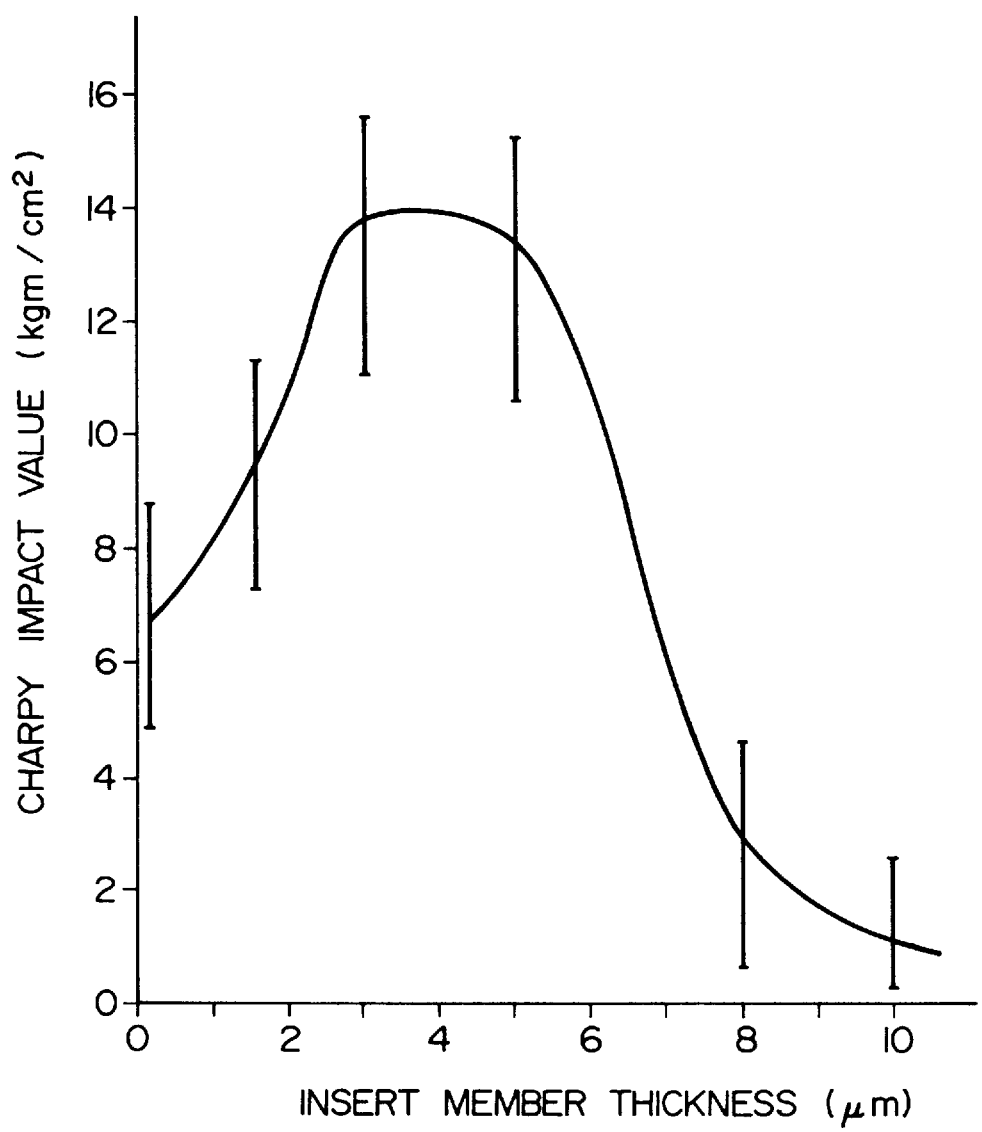
FIG. 4 is a diagram showing a relation between a charpy impact value of the joint and an insert member thickness.

In order to perform sufficiently the mutual diffusion, it is important for the thickness of the Ni—P layer 8 to be close to the roughness of the front end surfaces 7. As shown in FIG. 4, when the thickness of the Ni—P layer 8 is 2–6 μm, the charpy impact value is not less than 10 kg-m/cm². When the thickness of the Ni—P layer 8 is significantly smaller than the roughness of the front end surfaces 7, the melted Ni—P layer 8 cannot fill perfectly the voids on the front end surfaces 7 and the voids remain on the front end surfaces 7 so that the high charpy impact value of the joint layer 6 is not obtained. When the thickness of the Ni—P layer 8 is significantly larger than the roughness of the front end surfaces 7, the mutual diffusion is not performed sufficiently in the whole of the Ni—P layer 8 so that a high-Ni-and-P-content layer remains in the joint layer 6 and a Fe—Ni—Cr phosphide is precipitated and formed therein as shown in FIG. 5. The Fe—Ni—Cr phosphide cannot be absorbed by the joint layer 6 with the heating, and the strength of the joint layer 6 is deteriorated by the Fe—Ni—Cr phosphide.

Therefore, it is important that the mutual diffusion between (Ni and P) of the Ni—P layer 8 and (Fe and Cr) of the parts 1 and 2 is performed sufficiently in the whole of the Ni—P layer 8 or the joint layer 6 and the high-Ni-and-P-content layer in the Ni—P layer 8 or the joint layer 6 disappears completely before the Fe—Ni—Cr phosphide is generated. When the thickness of the Ni—P layer 8 is appropriate, the mutual diffusion between (Ni and P) of the Ni—P layer 8 and (Fe and Cr) of the parts 1 and 2 is performed sufficiently in the whole of the Ni—P layer 8 or the joint layer 6 and the high-Ni-and-P-content layer in the Ni—P layer 8 or the joint layer 6 disappears or diffuses into the parts 1 and 2 quickly before the Fe—Ni—Cr phosphide is generated so that the high charpy impact value of the joint layer 6 is obtained. As shown in FIG. 4, when the thickness of the Ni—P layer 8 is 2–6 μm, (Ni and P) of the Ni—P layer 8 diffuses into the parts 1 and 2 quickly and substantially completely, and the Fe—Ni—Cr phosphide is not generated. Incidentally, if the compression is not applied to the Ni—P layer 8 while the heating, the melted Ni—P layer 8 does not flow from the squashed micro-convex surfaces in the front end surfaces 7 to the voids so that the voids are not filled by the melted Ni—P layer 8 and remain on the front end surfaces 7, and the high charpy impact value of the joint layer 6 is not obtained.

When the thickness of the Ni—P layer 8 is larger than 6 μm, (Ni and P) of the Ni—P layer 8 does not diffuse into the parts 1 and 2 quickly and substantially completely to remain in the joint layer 6, and the Fe—Ni—Cr phosphide is generated. Therefore, the high charpy impact value of the joint layer 6 is not obtained.

An electrochemical plating may be used for forming the Ni—P layer 8 on the front end surfaces 7. Instead of the platings, the front end surfaces 7 may be coated with ultra fine grains of Ni—P alloy. The sub-micron diameter ultra fine powder of Ni—P alloy are mixed with an organic solvent, and a viscosity of the mixture determined by a mixing ratio between the ultra fine powder and the organic solvent is adjusted to obtain a constant desirable thickness of the mixture over the whole area of at least one of the front end surfaces 7 by a spinning coating. The organic solvent in the mixture vaporizes in the vacuum furnace 9 during the heating, so that the mutual diffusion bonding is not deteriorated by the organic solvent. Alternatively, it is preferable that the front end surface 7 of one of the parts 1 and 2 is coated with sub-micron diameter ultra fine grains of Ni and the front end surface 7 of another one of the parts 1 and 2 is coated with sub-micron diameter ultra fine grains of P. Instead of the platings, the front end surfaces 7 may be covered by a Ni—P alloy amorphous thin leaf. A heating temperature is limited below a maximum temperature for preventing an excessive crystal growth of at least one of the parts 1 and 2. The compression stress is limited below a maximum stress for preventing a buckling of at least one of the parts 1 and 2.

When the roughness of the front end surfaces 7 is between 3 μm and 5 μm, it is preferable for the thickness of the Ni—P layer 8 is about 3 μm. When the roughness of the front end surfaces 7 is less than 3 μm, it is preferable for the thickness of the Ni—P layer 8 to be about 1–3 μm. But, it is of no practical use that the roughness of the front end surfaces 7 is less than 1 μm, or the thickness of the Ni—P layer 8 is about 1–2 μm.

The charpy impact value of the joint layer 6 formed by the heating and compressing conditions (1050° C., 0.2 kg/mm² compression surface stress, heating time of 8 hours), the thickness of the Ni—P layer 8 of about 3 μm, the roughness of the front end surfaces 7 of 10 μm and the Ni—P layer 8 of 9 weight percent P is 2 kg·m/cm² with significantly large number of the voids in the joint layer 6. The charpy impact value of the joint layer 6 formed by the heating and compressing conditions (1050° C., 0.2 kg/mm² compression surface stress heating time of 8 hours), the thickness of the Ni—P layer 8 of about 8 μm, the roughness of the front end surfaces 7 of 10 μm and the Ni—P layer 8 of 9 weight percent P is small with the phosphide and no voids in the joint layer 6. The charpy impact value of the joint layer 6 formed by the heating and compressing conditions (1050° C., 0.2 kg/mm² compression surface stress, heating time of 20 hours), the thickness of the Ni—P layer 8 of about 8 μm, the roughness of the front end surfaces 7 of 10 μm and the Ni—P layer 8 of 4 weight percent P is not less than 10 kg·m/cm² with no phosphide and no voids in the joint layer 6. Instead of the Ni—P layer, a Ni—Si or Ni—B layer may be used.

Figure 6:
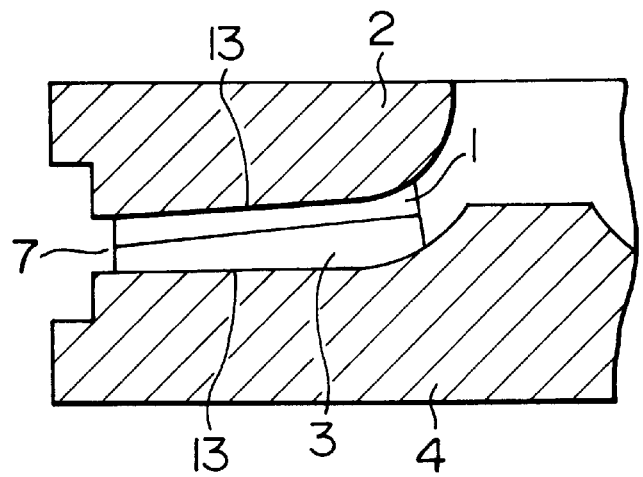
FIG. 6 is a partially cross-sectional view showing a joint between parts of another full-shroud vane wheel formed by the diffusion bonding according to the present invention.

FIG. 6 shows a second embodiment of the full-shroud vane wheel according to the present invention. The full-shroud vane wheel is made of Cr—Mo steel (2.25 weight percent Cr, 1 weight percent Mo). In this embodiment, the front end surfaces 7 of the parts 1 and 2 extend obliquely to the rotational axis of the vane wheel.

The Ni—P (phosphorus content: 9–10 weight percent) layer 8 with the thickness of about 4 μm (actual thickness 2—5 μm) is formed on the whole of the vane wheel including a fluid path surface 13 in addition to the front end surfaces 7 and the surfaces of vanes extending continuously from the front end surfaces 7 by the electroless plating. Each of the front end surfaces 7 of the part 1 and each of the front end surfaces 7 of the part 3 are made contact each other to form the vane, and the combination of the first and second members 30 and 31 is received by the inside of a vacuum hot-press furnace 9. After the inside of the vacuum hot-press furnace 9 is vacuumed to $10^{-4}$ torr by the vacuum device 10, the combination of the first and second members 30 and 31 is heated to 1000° C. by the heater 11. Subsequently, the combination of the first and second members 30 and 31 is compressed by the pressing device 12 to generate the compression surface stress of about 0.1 kg/mm² on the front end surfaces 7, and these heating and compressing conditions are kept for 6 hours.

Since the melting temperature of the Ni—P layer 8 is 880° C., the Ni—P layer 8 is melted on the front end surfaces 7 by the heating of 1000° C. so that the mutual diffusion between (Ni and P) of the Ni—P layer 8 and (Fe and Cr) of the parts 1 and 2 occurs without the voids and the phosphide. By the oil quenching (from 950° C.) and tempering (680° C.), the crystal structure of the whole of the full-shroud vane wheel including the joint layer 6 and the fluid path surface 13 is changed to the martensite crystal structure. The full-shroud vane wheel has a significantly high anti-corrosion characteristic against seawater in comparison with the quenched and tempered martensite of Cr—Mo steel, because the whole of surface of the full-shroud vane wheel according to the present invention is coated with the Ni—P layer, Ni and P of the Ni—P layer diffuse into the surface, and the crystal structure of the surface including the diffused Ni is quenched and tempered to be changed to the martensite crystal structure whose anti-corrosion characteristic improved by the diffused Ni. Ni content of the surface is slightly higher than that of the whole of the full-shroud vane wheel.

Against an ionized chlorine water solution of 10 ppm, a corrosion rate of the full-shroud vane wheel according to the present invention is one fifteenth of that of another full-shroud vane wheel which is made of 13 weight percent Cr cast steel and is not treated with the Ni—P layer, and a number of corrosion pits of the full-shroud vane wheel according to the present invention is significantly smaller than that of the another full-shroud vane wheel. After the corrosion test above, a fatigue strength of the full-shroud vane wheel according to the present invention is 35 kg/mm$^2$, and that of the another full-shroud vane wheel is 20 kg/mm$^2$. Since an axial height of the part 1 is substantially equal to that of the part 3 in each vane, the strength of the joint layer 6 is not deteriorated by stress concentrations generated at junctions of the part 1 and the side plate 2 and of the part 3 and the core plate 4.

Figure 8:
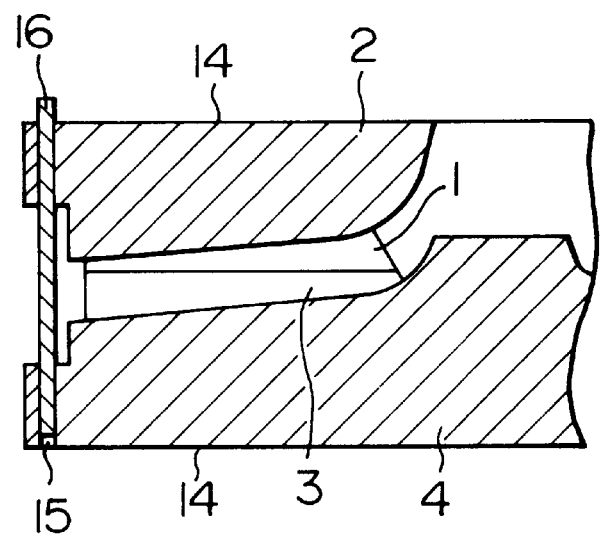
FIG. 8 is a partially cross-sectional view showing a joint between parts of another full-shroud vane wheel formed by the diffusion bonding according to the present invention.
Figure 7A:
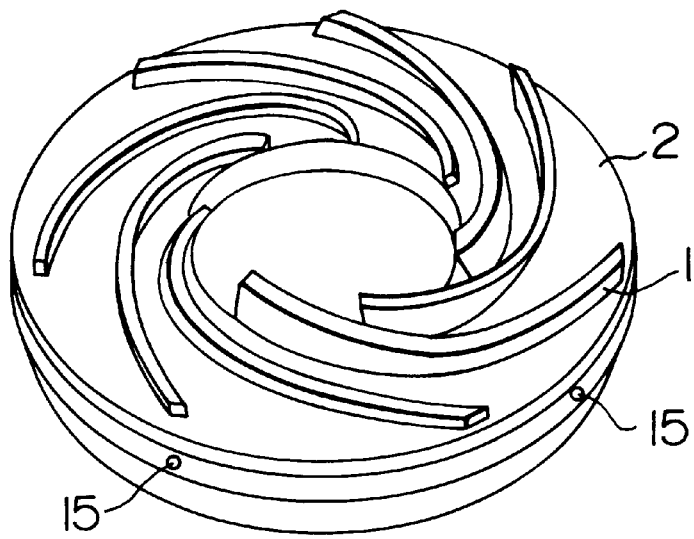
FIGS. 7a and 7b are schematic views showing respectively parts of another full-shroud vane wheel before the diffusion bonding according to the present invention.
Figure 7B:
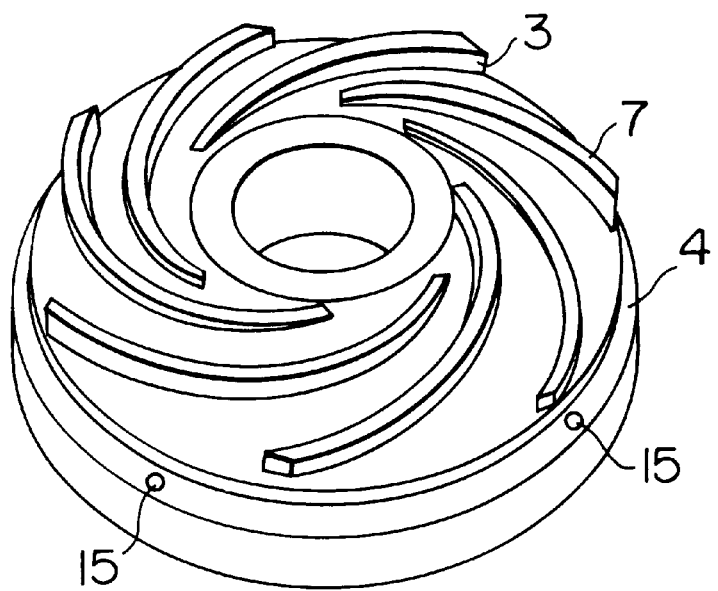
Figure 9:
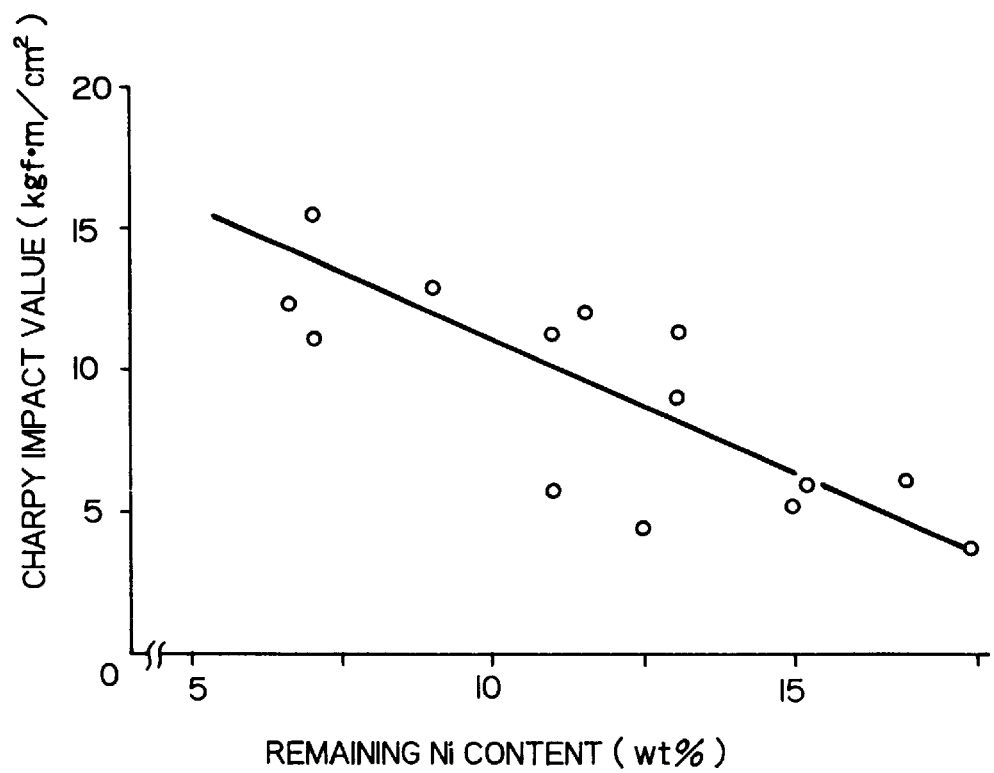
FIG. 9 is a diagram showing a relation between a remaining Ni content in the joint after the diffusion bonding and a charpy impact value of the joint.

FIGS. 7a–7b and 8 show a third embodiment of the full-shroud vane wheel according to the present invention. The full-shroud vane wheel with an outer diameter of 400 mm is made of 13 weight percent Cr steel. The first member 30 having the part 1 of each vane and the side plate 2 and the second member 31 having the part 3 of each vane and the core plate 4 are joined at the front end surfaces 7 by the diffusion bonding. The front end surfaces 7 of surface roughness 2–3 μm extend substantially perpendicularly to the rotational axis of the vane wheel and substantially parallel to pressed surfaces 14 on the side plate 2 and the core plate 4. The vanes formed by combinations of the parts 1 extend obliquely to the rotational axis of the vane wheel. The side plate 2 and the core plate 4 are positioned relatively to each other by inserting four pins 16 into respective pin holes 15 of the side plate 2 and the core plate 4, and subsequently joined by the diffusion bonding. Since the Ni—P layer 8 is arranged and melted on the front end surfaces 7, an excessive compression stress causing the buckling of the parts 1 and 3 or undesirable plastic deformation of the vane wheel is not necessary for the diffusion bonding.

What is claimed is:

1. A method for producing a joint between a first member and a second member, comprising the steps of:

making a first member and a second member contact an insert member whose melting temperature is lower than melting temperatures of the first and second members; p1 heating the insert member to a welding temperature which is lower than the melting temperatures of the first and second members and is higher than the melting temperature of the insert member so that a mutual diffusion occurs between at least an original base component of the insert member and at least an original base component of the first member different from the original base component of the insert member, and a mutual diffusion occurs between at least the original base component of the insert member and at least an original base component of the second member different from the original base component of the insert member are caused by the heating, wherein the original base components of the first and second members are iron, and the original base component of the insert member is nickel;

continuing the mutual diffusions by the heating at least until the original base component of the insert member is replaced by at least one of the original base components of the first member and the second member and the at least one of the original base components of the first member and the second member becomes a substitute base component of the insert member substantially throughout the entire thickness of the insert member so that the base component of the insert member becomes substantially identical to the at least one of the base components of the first and second members, and a mechanical strength and a characteristic for heat treatment of a joint between the first and second members become substantially equal to those of the first and second members; and then quenching and tempering the joint until a crystal structure of the joint is changed to a martensite crystal structure having an anti-corrosion characteristic improved by the nickel diffused therein.

2. A method according to claim 1, wherein the joint is quenched after the at least one of the original base components of the first member and the second member becomes the substitute base component of the insert member.

3. A method according to claim 1, wherein the original base components of the first member and the second member are carbon steel, and the original base component of the insert member is nickel.

4. A method according to claim 1, wherein diffusion bonding portions are formed between the first and second members contacting each other directly, between the first member and the insert member and between the second member and the insert member.

5. A method according to claim 1, wherein the mutual diffusions are performed while the insert member is compressed by the first and second members.

6. A method according to claim 1, wherein the insert member includes at least one of phosphorus, silicon and boron for decreasing the melting temperature of the insert member.

7. A method according to claim 1, wherein a thickness of the insert member is substantially equal to a roughness of the surfaces of the first and second members contacting the insert member.

8. A method according to claim 1, wherein the insert member includes two layers, one of which contacts the first member, and another one of which contacts the second member, an original base component of the one of the two layers is nickel, and an original base component of the another one of the two layers is phosphorus, silicon and boron.

9. A method according to claim 1, wherein the insert member is arranged on at least one of the first and second members through a plating process.

10. A method according to claim 1, wherein the insert member has an ultra fine grain shape.

11. A method according to claim 1, wherein the insert member has an amorphous leaf shape.

12. A method according to claim 1, wherein the welding temperature is not higher than a maximum temperature for preventing an excessive crystal growth of at least one of the first and second members.

13. A method according to claim 1, wherein the joint is annealed after the at least one of the original base components of the first member and the second member becomes the substitute base component of the insert member, at least partially in the insert member.

14. A method according to claim 1, wherein the joint is annealed and subsequently quenched, after the at least one of the original base components of the first member and the second member becomes the substitute base component of the insert member.

15. A method according to claim 1, wherein a mechanical strength and a characteristic for heat treatment of the joint are substantially equal to those of the first and second members.

16. A method for producing a joint having a first member and a second member, comprising the steps of:

covering at least one of the first and second members with a nickel base layer whose melting temperature is lower than melting temperatures of the first and second members, wherein each of said first and second members is made of steel, making the first and second members with the nickel base layers thereon contact each other, heating the nickel base layer to a welding temperature which is lower than the melting temperatures of the first and second members and is higher than the melting temperature of the nickel base layer so that a mutual diffusion between the nickel base layer and the first member and a mutual diffusion between the nickel base layer and the second member are caused by the heating, and quenching and tempering the joint with the joined first and second members so that a crystal structure of a surface of the joint including nickel diffused during the heating from the nickel base layer is changed to a martensite crystal structure whose anti-corrosion characteristic is improved by the diffused nickel.

17. A method according to claim 16, wherein the nickel content of the surface of the joint is slightly higher than that of the whole of the joint.

18. A method for producing a member with anti-corrosion surface, comprising the steps of:

covering the member with a nickel base layer whose melting temperature is lower than the melting temperature of the member, wherein the member is made of steel, heating the nickel base layer to a temperature which is lower than the melting temperature of the member and is higher than the melting temperature of the nickel base layer so that a mutual diffusion between the nickel base layer and the member is caused by the heating, and quenching and tempering the member so that a crystal structure of a surface of the member including nickel diffused during the heating from the nickel base layer is changed to a martensite crystal structure whose anti-corrosion characteristic is improved by the diffused nickel.

19. A method according to claim 18, wherein the nickel content of the surface of the member is slightly higher than that of the whole of the member.

20. A method for producing a joint having a first member and a second member, comprising the steps of:

making the first and second members contact a nickel base layer whose melting temperature is lower than melting temperatures of he first and second members, and heating the nickel base layer to a welding temperature which is lower than the melting temperatures of the first and second members and is higher than the melting temperature of the nickel base layer so that a mutual diffusion between the nickel base layer and the first member and a mutual diffusion between the nickel base layer and the second member are caused by the heating, wherein the nickel base layer includes a region in which the mutual diffusion relative to the first member is performed and the mutual diffusion relative to the second member is prevented, and another region in which the mutual diffusion relative to the second member is performed and the mutual diffusion relative to the first member is prevented, and the region and the another region are exposed to a fluid.

21. A method according to claim 20, wherein each of said first and second members is made of steel.

* * * * *